Nov. 1, 1955  C. W. BERTHIEZ  2,722,161
TURRET-HEAD FOR MACHINE-TOOLS WITH A ROTARY SPINDLE
Filed March 26, 1953  5 Sheets-Sheet 5

INVENTOR
Charles William Berthiez
BY
ATTORNEY

# United States Patent Office 2,722,161
Patented Nov. 1, 1955

2,722,161

TURRET-HEAD FOR MACHINE-TOOLS WITH A ROTARY SPINDLE

Charles William Berthiez, La Cote, Bizy-Vernon, France, assignor to societe anonyme dite: Societe Nouvelle de Construction de Machines-Outils et d'Outillage Procedes C. W. B., Paris, France Application March 26, 1953, Serial No. 344,793

Claims priority, application France April 15, 1952

12 Claims. (Cl. 90—11)

The invention relates to a turret-head adapted to be mounted on a machine-tool provided with a rotary spindle, such as for instance a milling and boring machine.

Turret-heads of this type have already been built, such as for instance the one described in my copending application Serial No. 241,679, filed August 13, 1951, for "Turret-Head for Machine-Tools With a Rotary Spindle Such as Milling and Boring Machines and the Like," but according to the embodiment described in said application, the end of the machine spindle is hidden by the turret-head when the latter is mounted on the headstock of the machine and it proves therefore necessary to remove the turret-head whenever working with the machine spindle is required.

According to another arrangement described in my application filed December 9, 1949, Serial No. 132,023, now Patent No. 2,682,698, issued July 6, 1954, for "Auxiliary Tool-Head Adaptable to a Boring and Milling Machine or Like Machine-Tools," the machine spindle passes through the turret which is co-axial with said spindle, which allows using the spindle without removing the turret. However, practice has proved that such an arrangement leads to intricate structures.

According to the present invention, the rotary turret mounted on a body adaptable to the spindle-carrying member of the machine is set on this body in such a way that said turret is offset with respect to the spindle axis and does not interfere with the spindle.

A bore is preferably provided in said body co-axially with the spindle to provide a passage for the spindle through the body.

According to another feature of the invention, the turret axis is at right angles with respect to the spindle axis.

The turret axis and the spindle axis are preferably not in the same plane.

According to still another embodiment, a rotary sleeve is mounted in the bore of the body and may be coupled to the machine spindle.

Other features of the invention are brought forward in the following specification and the accompanying drawings given merely by way of example and in which.

Figure 1:
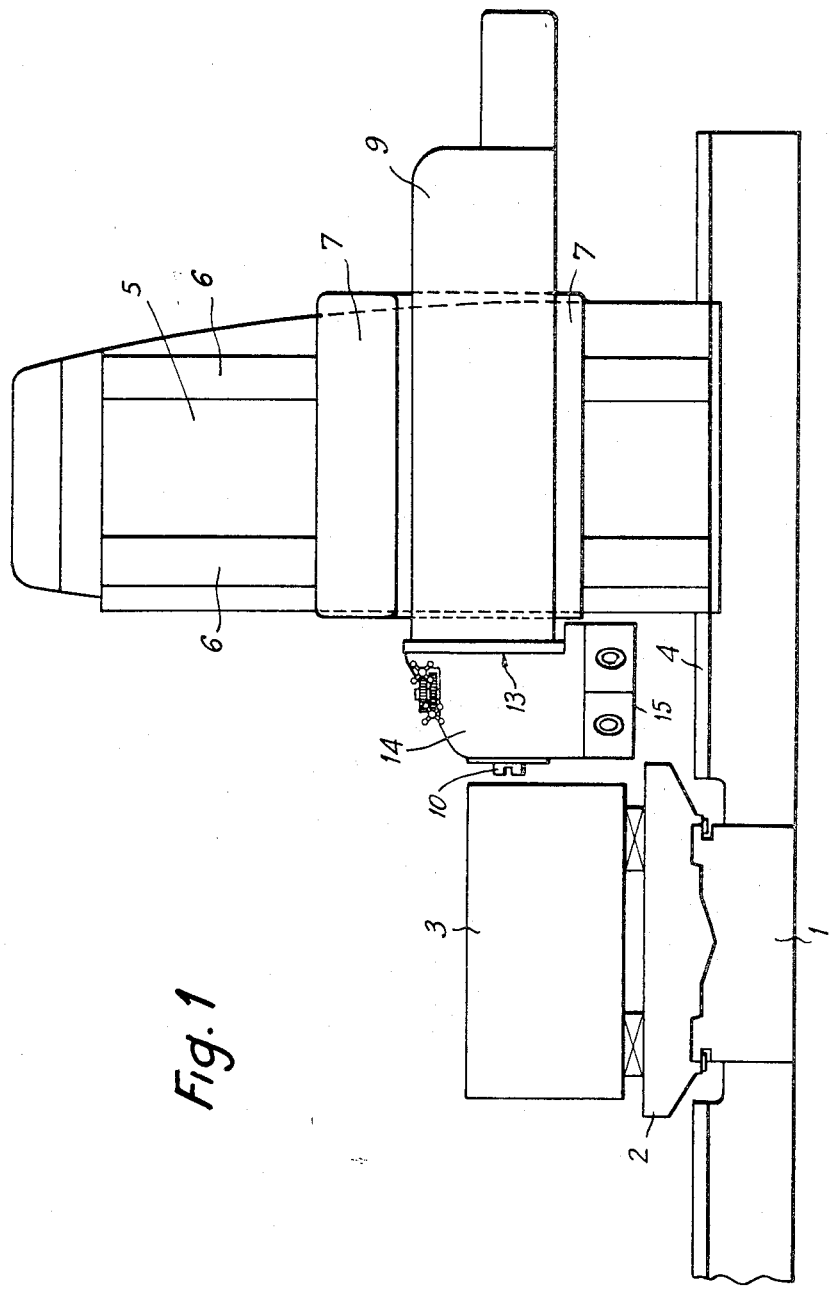
Fig. 1 is an outline of part of a milling and boring machine on the headstock of which a turret according to the invention is mounted.

Figs. 1 to 4 show the main members of a milling and boring machine, viz.: a bed 1 on which can slide a table 2 adapted to carry the workpiece 3 and a second bed 4 on which can slide a column 5 provided with vertical slideways 6 arranged to support and guide a saddle 7. That saddle is in its turn provided with horizontal slideways 8 on which a milling and boring headstock 9 can be shifted, the rotary spindle 10 of the headstock having its axis parallel to the slideways 8 of the saddle 7.

According to the invention, there is mounted on the end face 13 of the headstock 9, where the machine spindle 10 comes out, a revolving head composed of two main parts, viz.: a body 14 adapted to be set on the headstock 9 and a turret-head 15 mounted so as to rotate on this body around its axis 26.

The turret-head 15 is mounted in the body 14 by means of a tail piece or stem 16 supported in two taper roller bearings 17—18, the outer rings of which are fitted in a sliding sleeve 19. This sliding sleeve 19 is provided at its two ends with two cylindrical surfaces 22—23 so that it may slide for a minute displacement, the reason of which will be explained later, within two bores 24—25 machined in the body 14 co-axially with the axis of rotation 26 of the turret-head 15.

The top part of the tail piece or stem 16 is threaded and receives a clamping nut 27 the lower face of which bears on a machined face 28 of the body 14. Teeth are cut on the perimeter of this nut to constitute a worm-wheel which meshes with a worm 31 the axis 32 of which carries an operating turnstile 21. When this operating turnstile is tightened by turning, it will be seen that the upper face 29 of the turret-head bears against the lower face 30 of the body, this lower face being suitably machined. It is obvious that the action of tightening or loosening the clamping nut 27 provides a minute axial displacement of the turret-head and, as a result, a corresponding vertical displacement of the roller bearings 17—18 inside the body 14. Had these roller bearings been fitted direct into the bores of the body, they might have produced a substantial and detrimental axial movement at the time of tightening the turret-head to the body. It is for this reason that these bearings have been mounted in the body through the sliding sleeve 19. In this manner, when short vertical displacements of the turret-head take place, the sleeve moves the same distance inside the body and the bearings are not subject to any axial force caused by the clamping of the turret-head on the body.

In the drawings is shown a hexagonal turret-head capable of holding or carrying six tools, or tool-holders, but this number may be varied. The accurate indexing of each of the six positions of the turret-head on the body is assured by a locking device of any known type which is shown in dotted outline with reference numeral 33. In the example chosen, the turret-head being of large size, a mechanical device has been provided to rotate it. This device, shown diagrammatically, consists of a worm-wheel 34 secured to the upper part of the tail piece 16 of the turret-head, this wheel meshing with a worm 35 journalled in the body 14 and the shaft 36 of which is provided with an operating turnstile 37. This manual control is only shown as an example and, for large machines, would be replaced by a power control device using for instance an electric motor.

Figure 2:
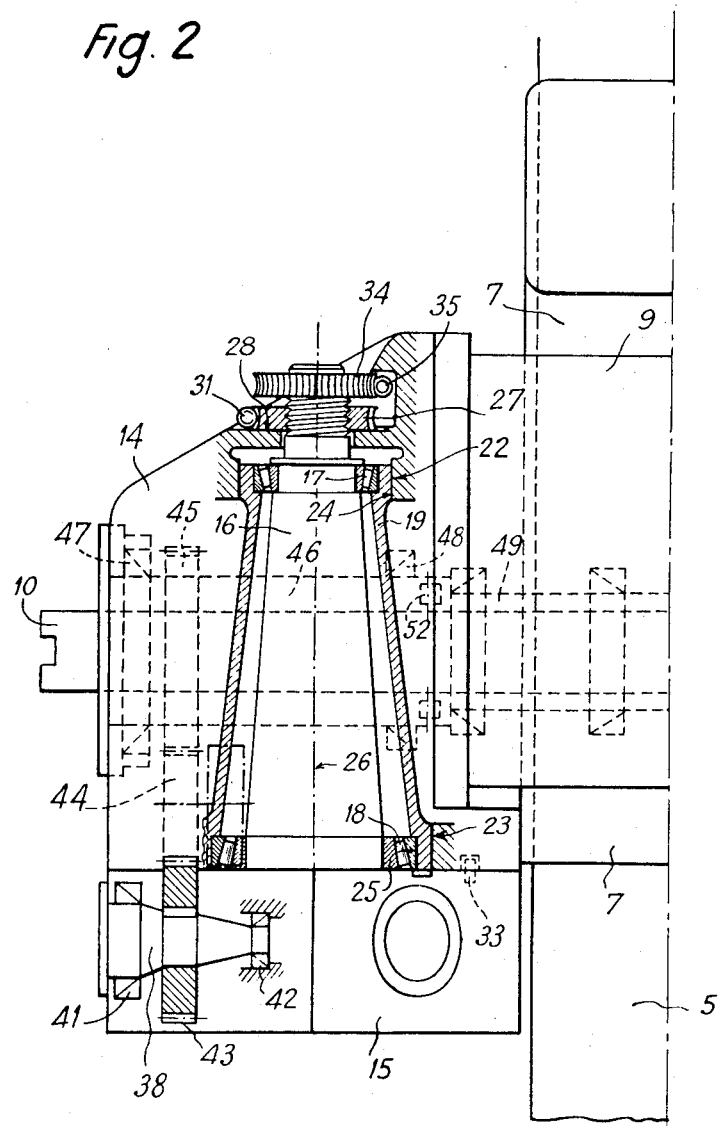
Fig. 2 is an elevational view, on a larger scale, of the turret-head of Fig. 1, some portions of which being cut away.
Figure 3:
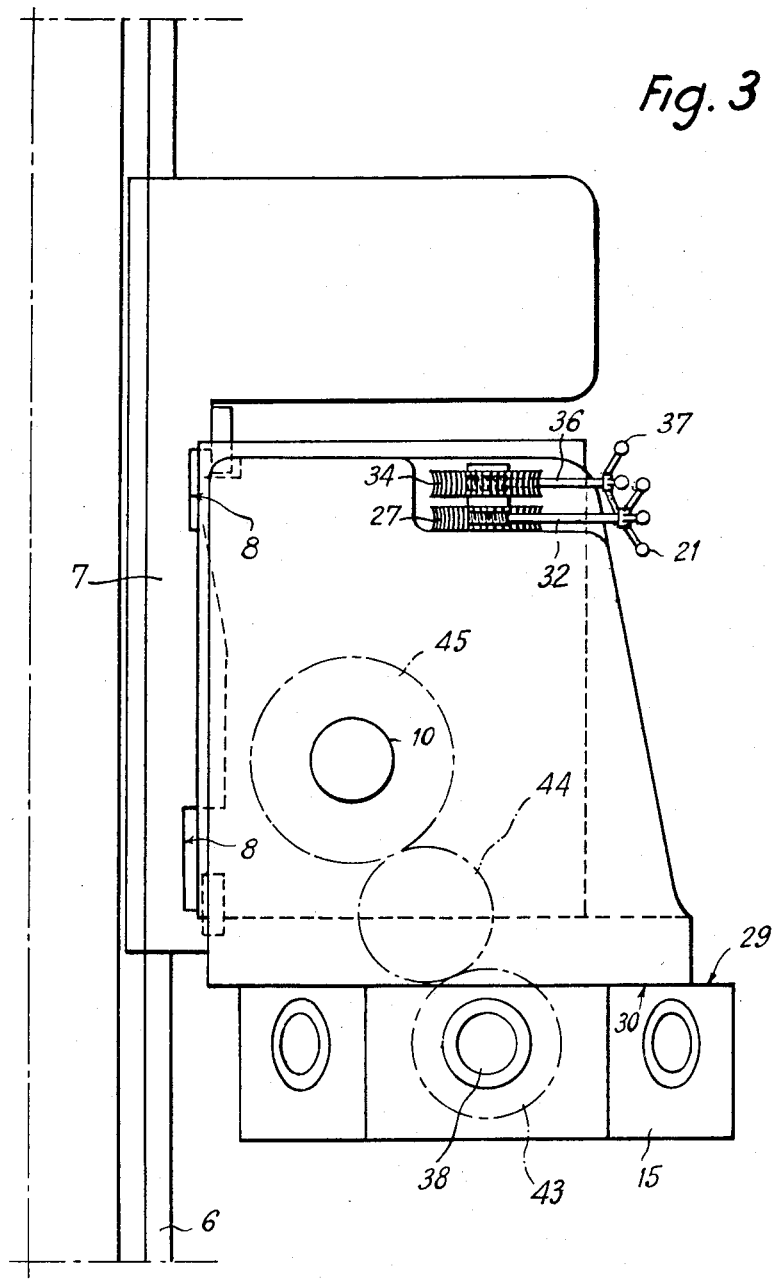
Fig. 3 is a corresponding side-view.
Figure 4:
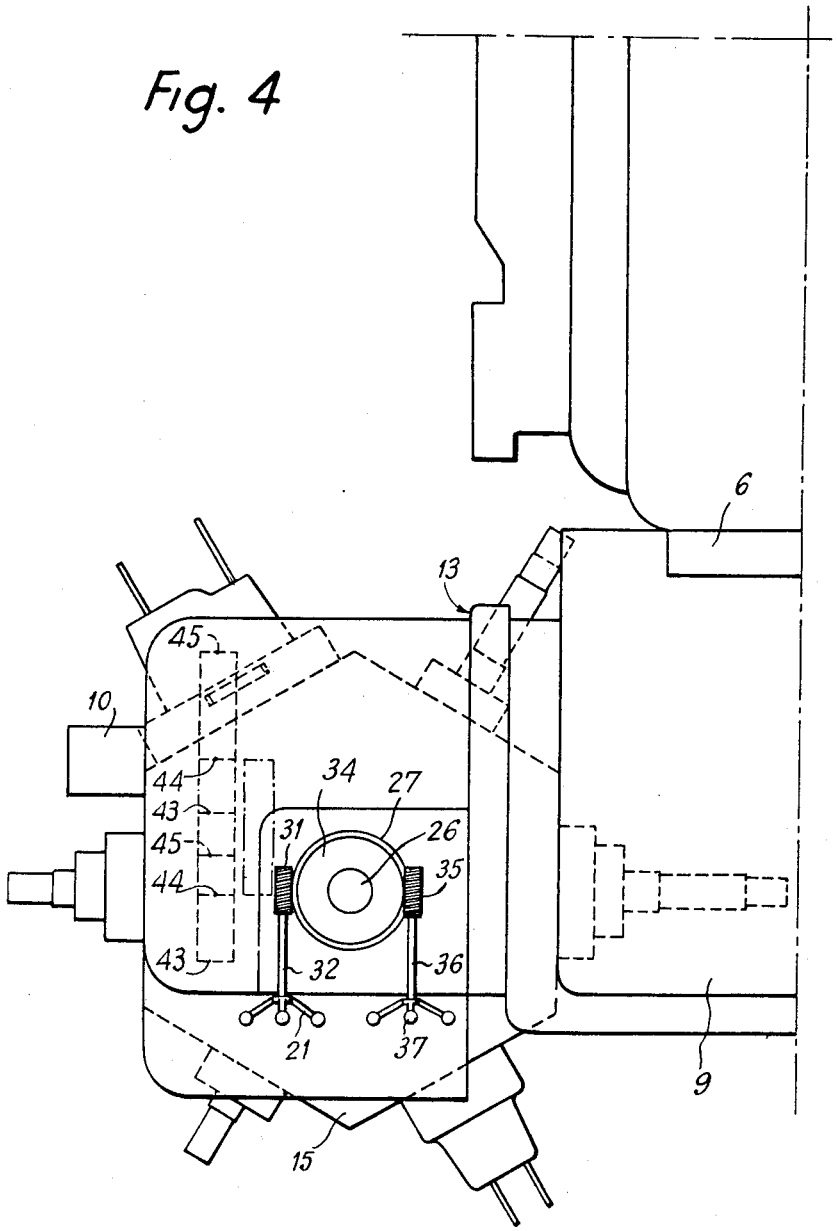
Fig. 4 is a top-view corresponding to Fig. 2.

In Fig. 2 it is readily seen that one turret-head station is occupied by a rotary tool-carrying spindle 38. This spindle is mounted in the turret-head by means of two taper roller bearings 41—42, and it is driven by an individual gear 43 keyed to this spindle and which meshes with an intermediary gear 44 rotatably mounted in the body, this intermediary gear meshing in its turn with a main gear 45 carried by a revolving sleeve 46. The latter is rotatably mounted in the body by means of two taper roller bearings 47—48 and its axis lines up with the axis of the spindle 10 of the machine. It is assumed, in the example chosen, that the milling and boring machine includes two concentric spindles, viz.: a milling spindle 49 which is adapted for rotational movement but which cannot be advanced or retracted axially in the headstock 9, and a second spindle, the boring spindle 10 mounted inside the spindle 49. This boring spindle can rotate together with the milling spindle and to which an axial feed motion can also be imparted. The rotary sleeve 46 mounted in the body is coupled with the milling spindle 49 of the machine by means of any known device diagrammatically shown in the drawing under reference numeral 52.

The intermediary gear 44 is adapted to slide on its axis in order to be disengaged from the individual gear 43, in order not to interfere with the rotary motion of the turret-head. This may be accomplished by means of any known arrangement such as for instance the arrangement commonly used in gear boxes.

The operation of this turret-head is self-explanatory.

Various machining operations can be successively carried out on the workpiece 3 by using one at a time the tools mounted on the turret-head. In order to set the different tools in their working position, all that has to be done is to release the turret-head by loosening the clamping nut 27 by turning the operating turnstile 21, then indexing the turret to the desired angle by means of the operating turnstile 37 and, finally, by clamping it again in its new position. Of course, care is taken to disengage the intermediary gear 44 whilst indexing the turret head. The rotary tools mounted in the turret-head are driven by the spindle of the machine, as previously explained, by means of the gears 43, 44, 45 and the revolving sleeve 46. It is to be noted that when the turret-head 15 carries several revolving tool-holder spindles, each of these spindles is driven when in its working position by the transmission made up by the gears 44 and 45, the revolving sleeve 46 and the spindle 49.

It is also to be noted that the arrangement described allows the use of the boring spindle 10 of the machine once the head is set on the headstock, since this spindle may pass through the body 14.

The revolving sleeve 46 may be used in the same manner as the milling spindle 49 if the body 14 were not mounted on the headstock. In other words: on a flange 61 on the end of this sleeve 46 any desired tool may be mounted (milling cutter, facing tool, etc.).

It will be understood, therefore, that the two spindles 10 and 49 may be used without removing the turret-head.

It is obvious that the revolving tool-holders of the turret-head can be replaced as desired by stationary tool-holders. This would be the case, for instance, if it was desired to use the machine for planer work by imparting to the table 2 a reciprocating movement at a cutting speed, or even for vertical turning work in providing the machine with a turn-table rotatable on a vertical axis and adapted to receive the workpiece.

Figure 5:
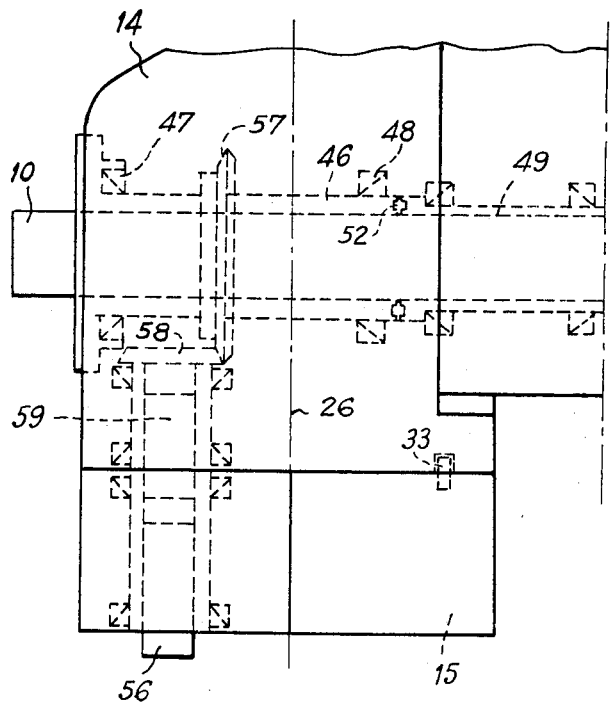
Fig. 5 is a modification of Fig. 2.

In Fig. 5 is represented a variation of the revolving head according to the invention, in which the revolving tool-holders 56 have their axes parallel to the axis of the turret 15, while in the embodiment of Figs. 1 to 4 the revolving tool-holders 38 have their axes perpendicular to the axis of the turret.

In the device of Fig. 5, the revolving tool-holder spindles are driven in the same way from the revolving sleeve 46. The transmission includes two bevel gears 57—58, one of which, namely gear 57 is integral with the revolving sleeve 46, whilst the other 58 is rotatively connected to a splined shaft 59 adapted to slide vertically in such a manner as enables it to be inserted as desired into the upper end of the tool-carrying spindle 56, this latter being provided with complementary grooves which provide a drive from the aforesaid splined shaft. The arrangement is such that the splined shaft 59 may be fully retracted inside the body 14 to allow the indexing movement of the turret-head.

The embodiment which has just been described with reference to Fig. 5 operates in a similar manner to the one which has been described with reference to Figs. 1 to 4.

Of course, the invention is not confined to the embodiments described and represented, which have only been given by way of examples. Thus the axis 26 of the rotary motion of the turret-head has been represented in a vertical position, but it is obvious that it is still within the scope of the invention if the axis of the turret-head were placed in a horizontal or oblique direction.

This axis has also been shown out of line with the axis of the spindle 10 of the machine, but it is easy to conceive a design in which both axes would be in the same plane.

Finally it would equally be possible to provide in one turret-head both revolving tool-holder spindles the axes of which are perpendicular to the revolving axis of the turret-head, as represented in Figs. 1 to 4, for instance, and revolving tool-holder spindles the axes of which are parallel to the revolving axis of the turret-head, as represented in Fig. 5 for instance. Still within the scope of the invention one could provide also revolving tool-holder spindles the axes of which would be oblique with respect to the revolving axis of the turret-head.

What I claim is:

1. A turret head for mounting in a machine tool, said machine tool having a spindle, and means for supporting said spindle for rotation thereof on the axis of the spindle, said turret head comprising a body having a form providing for removably mounting said body on said spindle supporting means in a predetermined relation to said spindle axis, and a turret supported by said body for rotation of said turret on its axis, said turret axis in the mounted position of said body extending transversely of and in offset relation to the axis of said spindle to dispose said turret in non-interfering relation to said spindle, said turret providing means for supporting a tool thereon for rotation of said tool with said turret to different positions about said turret axis and in non-interfering relation to said spindle.

2. A turret head as defined in claim 1 in which said body extends about said spindle to provide space for projection of said spindle parallel to its axis from said spindle supporting means.

3. A turret head as defined in claim 1 which comprises an extension spindle supported in said body for rotation thereof on the axis of rotation of said spindle of said machine tool and connectible to said machine tool spindle in the mounted position of said body for effecting rotation of said extension spindle upon rotation of said machine tool spindle.

4. A turret head as defined in claim 3 which comprises means carried by said extension spindle outwardly of said body along said spindle axis with respect to said machine tool spindle supporting means for carrying a tool on said extension spindle.

5. A turret head as defined in claim 1 which comprises a sleeve supported in said spindle supporting means for rotation of said sleeve on the axis of said spindle, said spindle being slidable axially through said sleeve, said sleeve and said spindle being connected for rotation together on said spindle axis, and a second sleeve supported in said body so as to be coaxial with said spindle in the mounted position of said body of said turret head and connectible in said mounted position to said spindle sleeve for rotation of said second sleeve upon rotation of said spindle sleeve, said spindle being axially slidable through said second sleeve to project beyond said body.

6. A turret head as defined in claim 1 which comprises a rotary tool holder mounted in said turret for rotation of said tool holder relative to said turret on an axis disposed in a predetermined relation to the axis of rotation of said turret, and transmission means supported by said body and operatively connected to said tool holder and operatively connectible to said spindle in the mounted position of said body of said turret head for effecting rotation of said tool holder upon rotation of said spindle.

7. A turret head as defined in claim 6 in which said tool holder axis is transverse to said axis of said turret.

8. A turret head as defined in claim 6 in which said tool holder axis is parallel to said axis of said turret.

9. A turret head as defined in claim 6 in which said transmission comprises an element movable out of rotation effecting engagement with another element of said transmission to provide for free indexing rotation of said turret on its axis.

10. A turret head as defined in claim 1 which comprises a member supported in said body for movement of said member relative to said body parallel to the axis of rotation of said turret and supporting said turret for rotation thereof on its axis relative to said member, said member supporting said turret against movement of said turret relative to said member parallel to said turret axis, and means operatively connecting said turret and said body and operable between two positions respectively to provide for and to prevent movement of said turret and said member relative to said body in any position of said turret to which it is rotatable about its axis.

11. A turret head as defined in claim 10 which comprises means supported on said body of said turret head and operatively connected to said turret and operable for effecting indexing rotation of said turret on its axis upon operation of said movement preventing means to release said turret.

12. A turret head for mounting in a machine tool, said machine tool having a spindle, and means for supporting said spindle for rotation thereof on the axis of the spindle, said turret head comprising a body having a form providing for removably mounting said body on said spindle supporting means in a predetermined relation to said spindle axis, a turret rotatable on its axis, a sleeve supported in said body in concentric relation to the axis of said turret, said turret axis in the mounted position of said body extending transversely of and in offset relation to the axis of said spindle to dispose said turret in non-interfering relation to said spindle, said sleeve being supported in said body for axial movement thereof relative to said body, said turret having a stem coaxial with the axis of said turret and extending within said sleeve, said sleeve supporting bearings spaced along said axis of the turret and engaging said stem for supporting said stem and turret for rotation thereof relative to said sleeve and relative to said body of said turret head while preventing axial movement of said turret and stem relative to said sleeve, means operatively connected to said stem and to said body of said turret head and operable to effect axial movement of said stem and said sleeve to produce axial movement of said turret relative to said body into and out of engagement with said body for clamping said turret head against said body and for releasing said turret head for rotation thereof.

References Cited in the file of this patent

UNITED STATES PATENTS

| | | |
|---|---|---|
| 1,283,135 | Fortin | Oct. 29, 1918 |
| 2,227,410 | Johnson | Dec. 31, 1940 |